US012246508B2

(12) United States Patent
Furlotti et al.

(10) Patent No.: US 12,246,508 B2
(45) Date of Patent: Mar. 11, 2025

(54) METHOD, CUTTING DEVICE AND APPARATUS PARTICULARLY FOR MANUFACTURING POUCHES WITH ROUNDED CORNERS

(71) Applicant: I.M.A. INDUSTRIA MACCHINE AUTOMATICHE S.P.A., Ozzano Dell'Emilia (IT)

(72) Inventors: Filippo Furlotti, Cazzola (IT); Luca Catellani, Ozzano Dell'Emilia (IT); Andrea Trevisan, Ozzano Dell'Emilia (IT)

(73) Assignee: I.M.A. Industria Macchine Automatiche S.P.A., Ozzano Dell'Emilia (IT)

( * ) Notice: Subject to any disclaimer, the term of this patent is extended or adjusted under 35 U.S.C. 154(b) by 55 days.

(21) Appl. No.: 18/247,678

(22) PCT Filed: Nov. 11, 2021

(86) PCT No.: PCT/EP2021/081431
§ 371 (c)(1),
(2) Date: Apr. 3, 2023

(87) PCT Pub. No.: WO2022/106300
PCT Pub. Date: May 27, 2022

(65) Prior Publication Data

US 2023/0405959 A1 Dec. 21, 2023

(30) Foreign Application Priority Data

Nov. 23, 2020 (IT) ........................ 102020000027989

(51) Int. Cl.
*B31B 70/14* (2017.01)
*B26D 1/08* (2006.01)
(Continued)

(52) U.S. Cl.
CPC ............ *B31B 70/148* (2017.08); *B26D 1/085* (2013.01); *B31B 2155/00* (2017.08); *B31B 2160/106* (2017.08)

(58) Field of Classification Search
CPC .......... B26D 1/08; B26D 1/085; B26D 1/455; B26D 1/605; B26D 5/02;
(Continued)

(56) References Cited

U.S. PATENT DOCUMENTS

| | | | | |
|---|---|---|---|---|
| 3,779,121 A * | 12/1973 | Lagain | B26D 1/045 | |
| | | | 83/639.1 | |
| 3,888,066 A * | 6/1975 | Tabur | B65B 61/16 | |
| | | | 53/511 | |

(Continued)

FOREIGN PATENT DOCUMENTS

| | | |
|---|---|---|
| EP | 0202053 A2 | 11/1986 |
| WO | 2017078523 A1 | 5/2017 |
| WO | 2018177895 A1 | 10/2018 |

OTHER PUBLICATIONS

International Search Report and Written Opinion for International Patent Application No. PCT/EP2021/081431 completed on Jan. 20, 2022.

(Continued)

*Primary Examiner* — Joshua G Kotis
(74) *Attorney, Agent, or Firm* — Carlson, Gaskey & Olds, P.C.

(57) ABSTRACT

A method, a cutting device and an apparatus wherein, at cusp-shaped recesses obtained by die cutting on a ribbon in order to obtain pouches with rounded corners, the ribbon is cut transversely by means of at least two strokes of a blade. A relative translation is performed, between the first stroke and the second stroke, between the cutting plane and the ribbon substantially along a feeding direction of the ribbon,
(Continued)

so as to level with the second stroke any cutting defects of the first stroke in the region of the recess.

13 Claims, 9 Drawing Sheets

(51) Int. Cl.
*B31B 155/00* (2017.01)
*B31B 160/10* (2017.01)

(58) Field of Classification Search
CPC . B26D 2001/0033; B65B 61/06; B31B 70/16; B31B 70/20; B31B 2160/106
USPC .................................................. 493/227, 239
See application file for complete search history.

(56) References Cited

U.S. PATENT DOCUMENTS

| | | | | |
|---|---|---|---|---|
| 4,088,049 | A * | 5/1978 | Benedict | D06H 7/02 83/240 |
| 4,317,399 | A | 3/1982 | Romagnoli | |
| 4,570,418 | A * | 2/1986 | Gino | B65B 5/106 53/244 |
| 2004/0234174 | A1 * | 11/2004 | Caudle | B29C 66/431 383/104 |
| 2010/0210439 | A1 * | 8/2010 | Goto | B65B 61/18 493/200 |
| 2011/0089228 | A1 * | 4/2011 | Goto | B26D 7/025 234/128 |
| 2012/0135845 | A1 * | 5/2012 | Totani | B26D 3/10 493/189 |
| 2015/0096263 | A1 * | 4/2015 | Ehrmann | B65B 41/16 53/411 |
| 2019/0016494 | A1 * | 1/2019 | Hölle | B65B 43/08 |
| 2019/0070742 | A1 * | 3/2019 | Ruhland | B26D 1/626 |
| 2021/0402632 | A1 * | 12/2021 | Mueller | B26D 1/015 |

OTHER PUBLICATIONS

Italian Search Report for Italian Patent Application No. IT2020000027989 completed on Jul. 28, 2021.

* cited by examiner

METHOD, CUTTING DEVICE AND APPARATUS PARTICULARLY FOR MANUFACTURING POUCHES WITH ROUNDED CORNERS

The present invention relates to a method, a cutting device and an apparatus particularly for manufacturing pouches with rounded corners for flexible containers such as Doypacks® and the like.

In the background art, methods and machines for the manufacture of this type of pouch, such as for example those of PCT Application WO2018/177895, are known.

The pouches are provided starting from at least two sheets (or from a single sheet folded onto itself) which are optionally in turn composed of multiple layers and of which at least one sheet or layer can comprise or be constituted by materials such as aluminum, PE, PP or other thermoplastic materials.

The sheets, which are unwound from respective reels, are superimposed (or, in the case of a single sheet, folded in half along the longitudinal centerline) and then mutually coupled at joining strips, which are typically transverse and longitudinal in order to form a sort of joining grid.

Downstream of this coupling operation, the sheets are rendered integral with each other at the joining strips, thus forming a ribbon inside which respective pockets are formed in the regions surrounded, i.e., not affected, by the joining strips.

The ribbon can be subsequently conveniently cut longitudinally in order to form a plurality of parallel ribbons and in any case at the end is cut transversely in the form of final pouches.

In order to prevent the obtained pouches from having sharp edges at the corners, it is known to perform, before cutting, a die-cutting operation along the edges of the ribbon and/or in the regions of mutual intersection of the joining strips, so that after the final cutting the corners of each pouch are without sharp edges, i.e., are rounded. The shape of the die-cutting tool is usually circular or quadrangular with preferably concave sides (for example, a shape similar to an asteroid) and is such to leave, on the edges of the longitudinally cut ribbon, recesses which, in the case of quadrangular shapes with concave sides, are substantially cusp-shaped.

One drawback of this pouch manufacturing method is that when the transverse cut is performed at a joining strip which separates two (transverse rows of) adjacent pockets of the ribbon, this cut may not occur exactly in the middle of the joining strip, i.e., not exactly at the tip of the cusp formed on one or both of the sides of the transverse joining strip between two pockets.

In this case, one of the two pouches obtained by the transverse cut will have, near the corners, a burr which corresponds to the initial portion of the rise from the tip of the original cusp toward the pocket originally adjacent to that of the pouch subsequently obtained with the transverse cut.

This cut-off burr, besides reducing the quality of the pouch, is also unpleasant to the touch and potentially sharp, especially if the source sheets contain materials such as aluminum, PE, PET, PP.

The aim of the present invention is to provide a method for manufacturing pouches for flexible containers such as stand-up pouches (Doypacks®) and the like, as well as a cutting device and a corresponding apparatus, that are capable of improving the prior art in one or more of the aspects mentioned above.

Within the scope of this aim, an object of the invention is to avoid the forming of burrs as a consequence of the transverse cutting of a ribbon.

In particular, an object of the invention is to compensate any inaccuracies of the transverse cutting of a ribbon, or of multiple ribbons arranged side by side, at recesses arranged along the lateral edges of the ribbon or ribbons and/or at through die-cut portions arranged along the ribbon or ribbons.

Another object of the invention is to allow its application to existing apparatuses for manufacturing pouches for flexible containers such as Doypacks® and the like.

Moreover, an object of the present invention is to overcome the drawbacks of the background art in a manner that is alternative to any existing solutions.

Another object of the invention is to provide a method, a cutting device and a corresponding apparatus for manufacturing pouches which are highly reliable, relatively easy to provide and at competitive costs.

This aim and these and other objects which will become better apparent hereinafter are achieved by a cutting method particularly for manufacturing pouches of flexible containers with rounded corners such as Doypacks® and the like, optionally provided with one or more of the characteristics of the dependent claims.

This aim and the objects of the invention are also achieved by the cutting device and by the apparatus.

Further characteristics and advantages of the invention will become better apparent from the description of a preferred but not exclusive embodiment of the invention, illustrated by way of non-limiting example in the accompanying drawings, wherein:

FIG. 1 is a schematic view of an apparatus for manufacturing pouches of flexible containers with rounded corners such as Doypacks® and the like, according to the invention;

FIG. 2*a* is a front view of a transverse cutting device according to the invention, in a first position;

FIG. 2*b* is a sectional view of FIG. 2*a*, taken along a central longitudinal plane;

Figure 1:
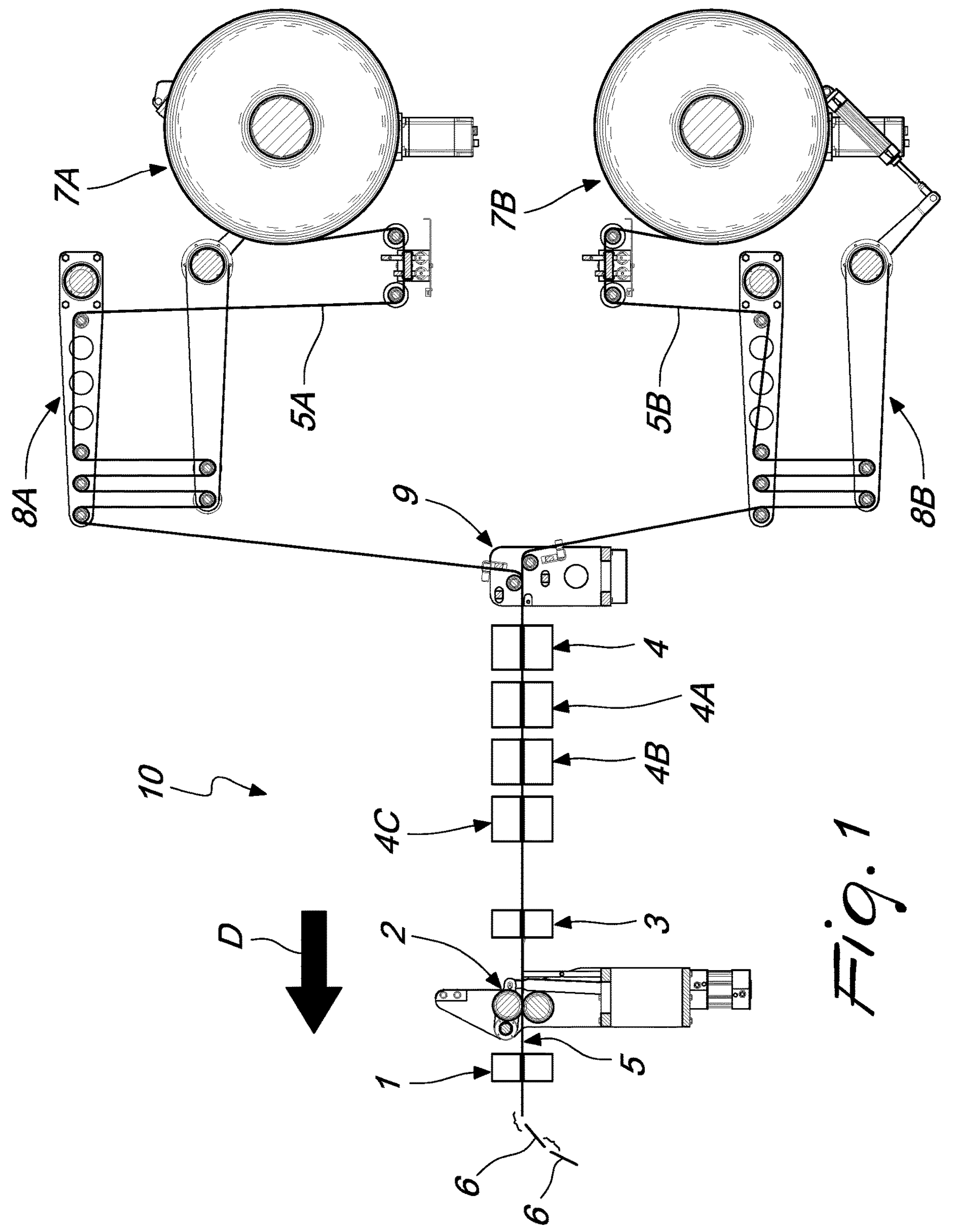
Figure 2A:
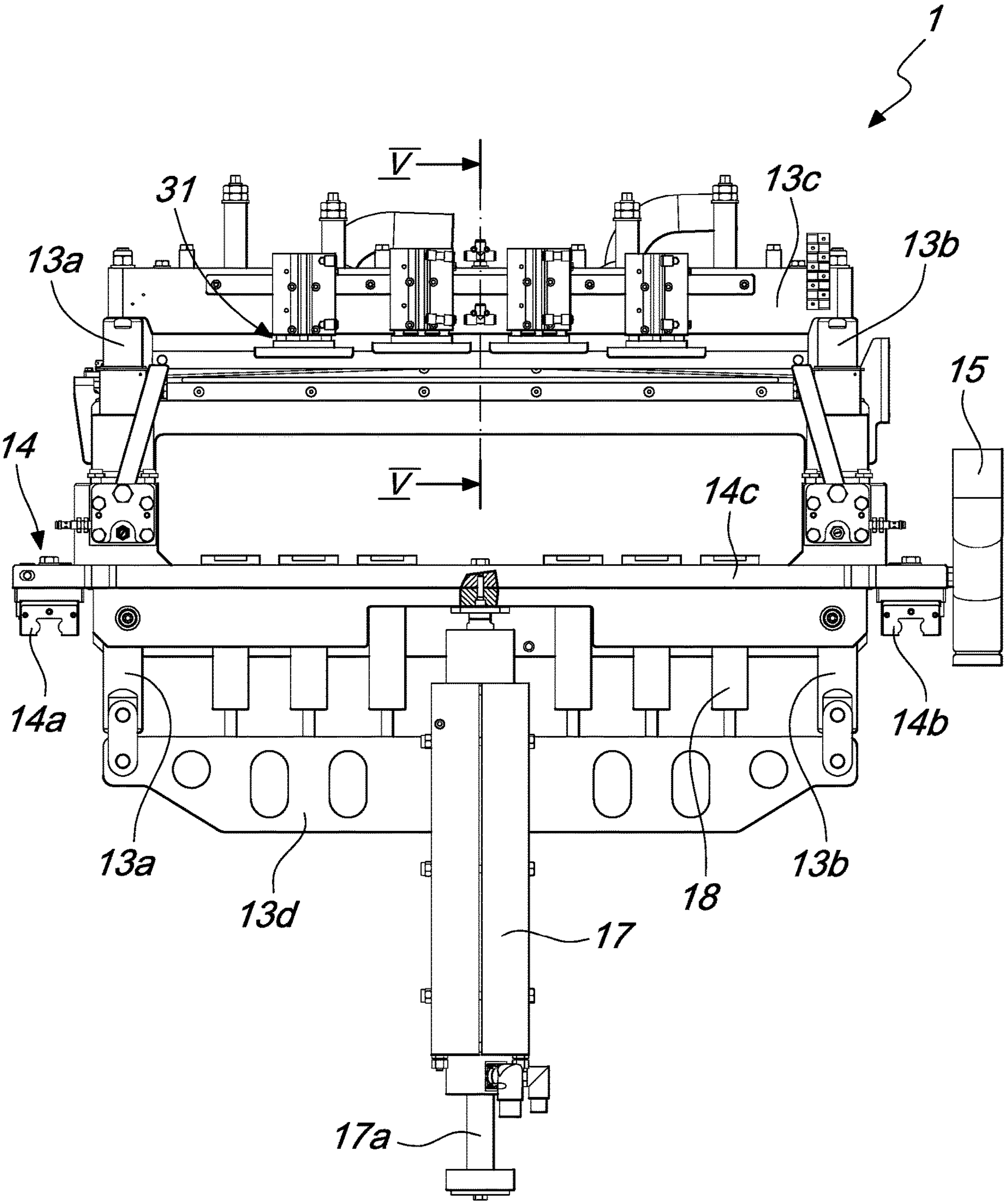
Figure 2B:
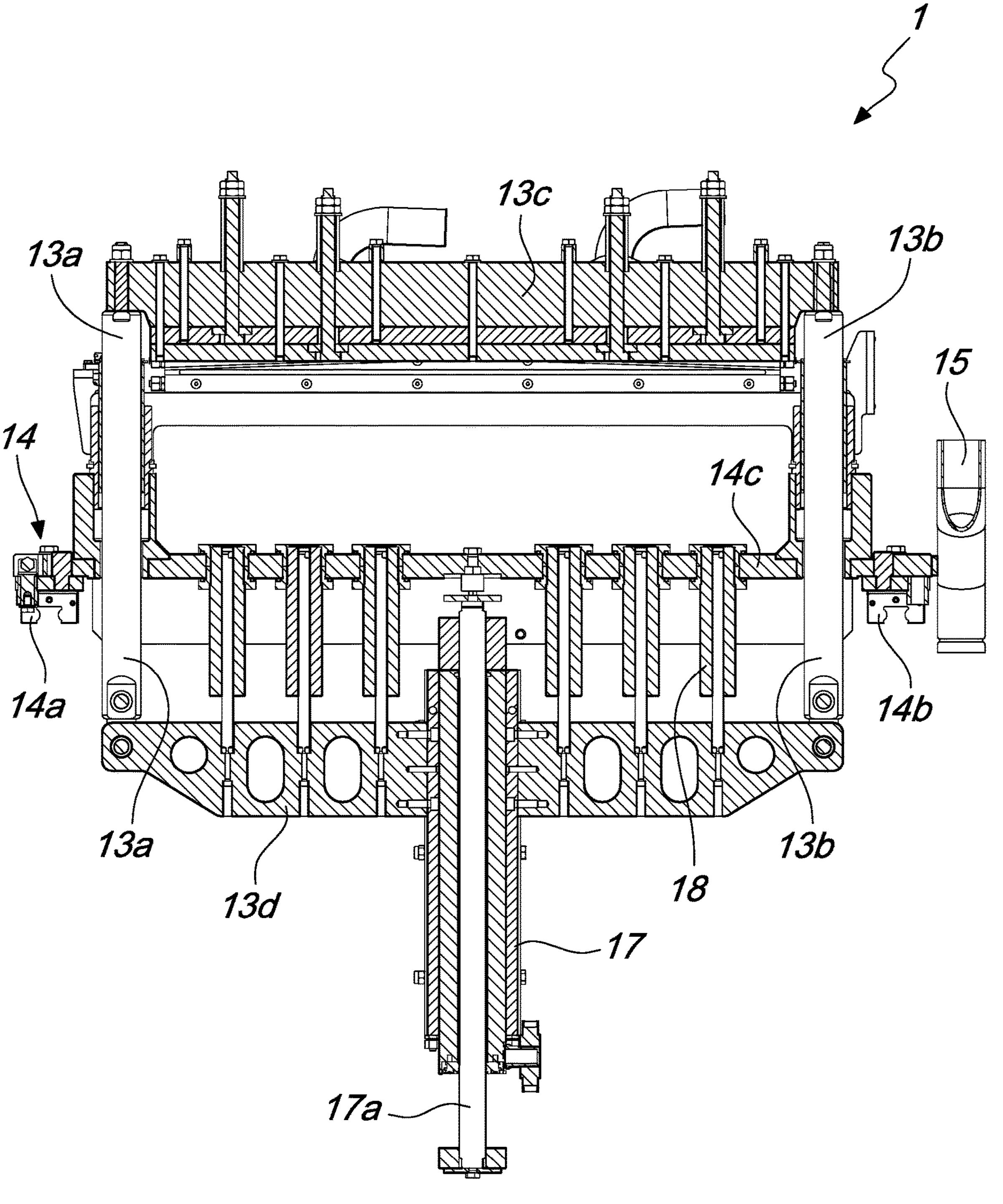
Figure 3:
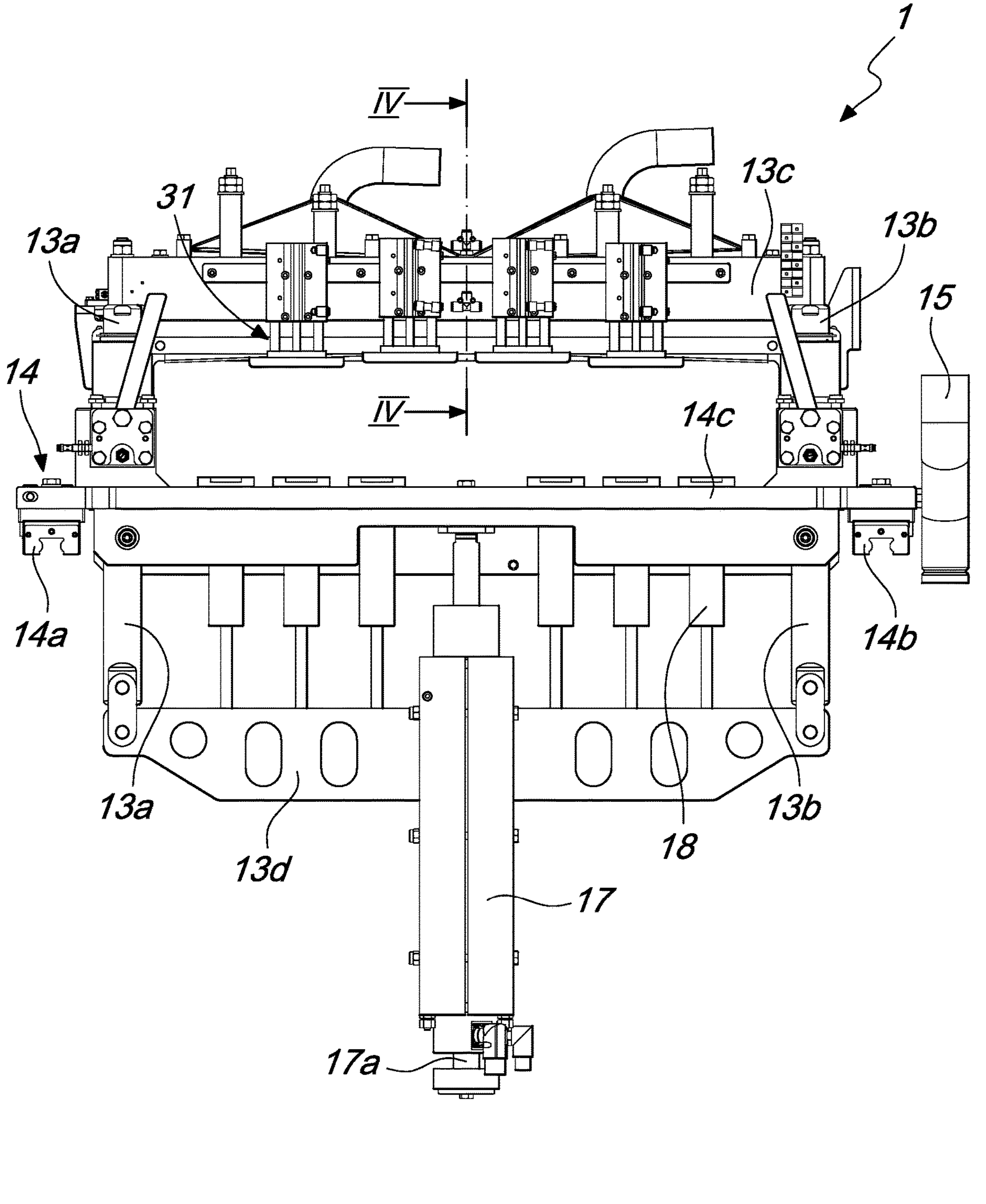
FIG. 3 is a front view of the transverse cutting device of FIG. 2*a*, but in a second position.

With reference to the cited figures, an apparatus for manufacturing pouches of flexible containers with rounded corners such as Doypacks® and the like, according to the invention, is generally designated by the reference numeral 10 and comprises means 8A, 8B for unwinding at least one sheet in reel form, preferably two sheets 5A, 5B, from respective reels 7A, 7B, as in the case shown in FIG. 1.

The sheets 5A and 5B can each be formed by a plurality of layers, each constituted by or comprising known materials used in the field of packaging to form so-called pouches or Doypacks®, for example for fruit purees, drinks or powders. These materials can be selected from the group comprising aluminum, PE, PET, PP, OPP and/or other thermoplastic materials.

A layer made of thermoplastic material, preferably polyethylene (PE), can be arranged so as to be visible from outside once the pouch 6 is formed. An example of sheet 5A and/or 5B might be made of at least two layers of a respective thermoplastic material, for example PE and/or PET (polyethylene terephthalate), optionally interspersed with other materials, for example an aluminum layer or an aluminum layer and a nylon layer.

Examples of sheets 5A and 5B particularly adapted to be processed according to the teachings of the invention provide for one among these sheets:

single-layer sheet made of PE;
two-layer sheet: PE/PET;
three-layer sheet: PE/Alu/PET;
four-layer sheet: PE/Nylon/Alu/PET.

The unwinding means may comprise, besides the cylinders for supporting the rotation of the reels 7A, 7B, also tensioning rollers, which are optionally mutually movable, and overlap cylinders 9 adapted to superimpose the two sheets 5A and 5B substantially in register.

In the case (not shown) of an apparatus with a single reel, the unwinding means can comprise, in a per se known manner, also a folding wedge in order to fold longitudinally in half the single sheet so that the two halves can be subsequently superimposed on each other by the overlap means.

Downstream of the unwinding means with respect to the unwinding direction, the apparatus 10 comprises coupling means 4, 4B for mutually fixing the two sheets 5A and 5B one on the other (or, in the example of embodiment not shown, the two halves of the single sheet folded onto itself) along at least transverse joining strips 51. The strips 51 are substantially rectilinear and mutually parallel along at least one transverse direction which is preferably at right angles to a substantially rectilinear direction D of advancement of the sheets 5A and 5B, also referenced herein as feeding direction D.

The coupling can be obtained by heat-sealing, taping and/or gluing at least along transverse bands of the superimposed sheets, in order to mutually anchor the sheets, forming the joining strips 51. A ribbon 5 is thus obtained which is made to advance in step mode in the feeding direction D.

There are also means for the stepwise advancement of the ribbon 5 along the feeding direction D, which is substantially parallel to or coincides with the longitudinal direction of the ribbon 5. The advancement step is preferably equal to, or a multiple of, the distance between two pockets 53 arranged side by side in said longitudinal direction of the ribbon 5.

The advancement means can comprise a traction station 2 arranged downstream of the coupling means 4 and optionally 4B and said station 2 can be provided with mutually opposite traction rollers which pull in the feeding direction D the ribbon 5 interposed between them.

As an alternative or as an addition to said traction rollers, the traction station 2 can comprise other per se known stepwise traction solutions, for example a conveyor with cleats or movable clamps which, with a movement that is substantially parallel to the feeding direction D, retain temporarily the external edges of the ribbon 5 in order to make it advance by one or more steps in the feeding direction D, to then release it, return and repeat the operation.

Preferably, the two superimposed sheets 5A and 5B are joined in a similar manner also at one or more longitudinal joining strips 52, which are substantially rectilinear and parallel to the advancement direction D of the sheets 5A, 5B and form a joining grid together with the transverse joining strips 51. The coupling means 4B for obtaining longitudinal joining strips 52 can be separate with respect to the coupling means in order to obtain the transverse joining strips 51, but they operate in a similar manner, for example by heat-sealing, taping and/or gluing.

The coupling means 4, 4B, as well as the coupling by virtue of joining strips or grids between superimposed sheets for manufacturing pouches, are per se known in the field.

The apparatus 10 furthermore provides advantageously a cooling station 4A downstream of the coupling means with respect to the feeding direction D, in order to cool the ribbon 5 at least at the joining strips 51 and optionally 52. For example, the cooling station 4A can be interposed between the coupling means 4 and 4B.

The joining strips 51 and optionally 52 are adapted to form, evenly arranged side by side along at least the longitudinal direction of the ribbon a plurality of pockets 53 in the regions not affected by the joining strips 51 or 52, i.e., in the regions surrounded by the joining strips 51 and 52.

The pockets 53 are such as to have an open side 54, for example in the regions not affected, or affected only partially, by the longitudinal joining strips 52.

In the illustrated example, therefore, the transverse joining strips 51 form the sides of the pouches 6, while the longitudinal joining strips 52 will form the bottoms of the pouches 6.

The apparatus 10 can also comprise longitudinal cutting means 3, of a per se known type, which are adapted to cut the ribbon 5 along the longitudinal joining strips 52 and to consequently form a plurality of substantially parallel ribbons. Hereinafter, the expression "ribbon 5" will be used also with reference to the set of these parallel ribbons obtained from the ribbon 5 with said optional longitudinal cut.

Figure 7:
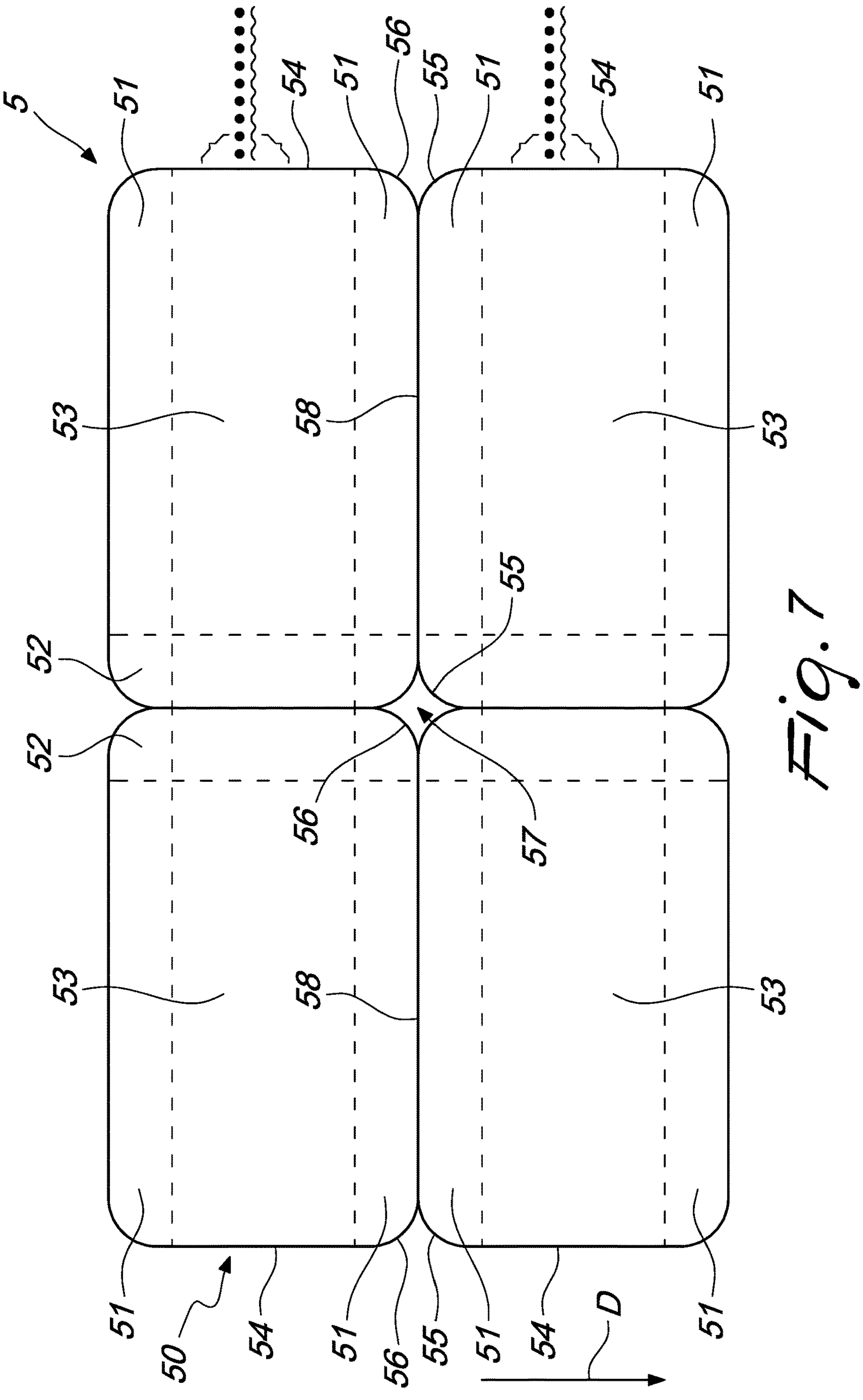
FIG. 7 is a partial view of a ribbon upstream of the feeding inlet of the cutting device of the preceding figures.
Figure 8:
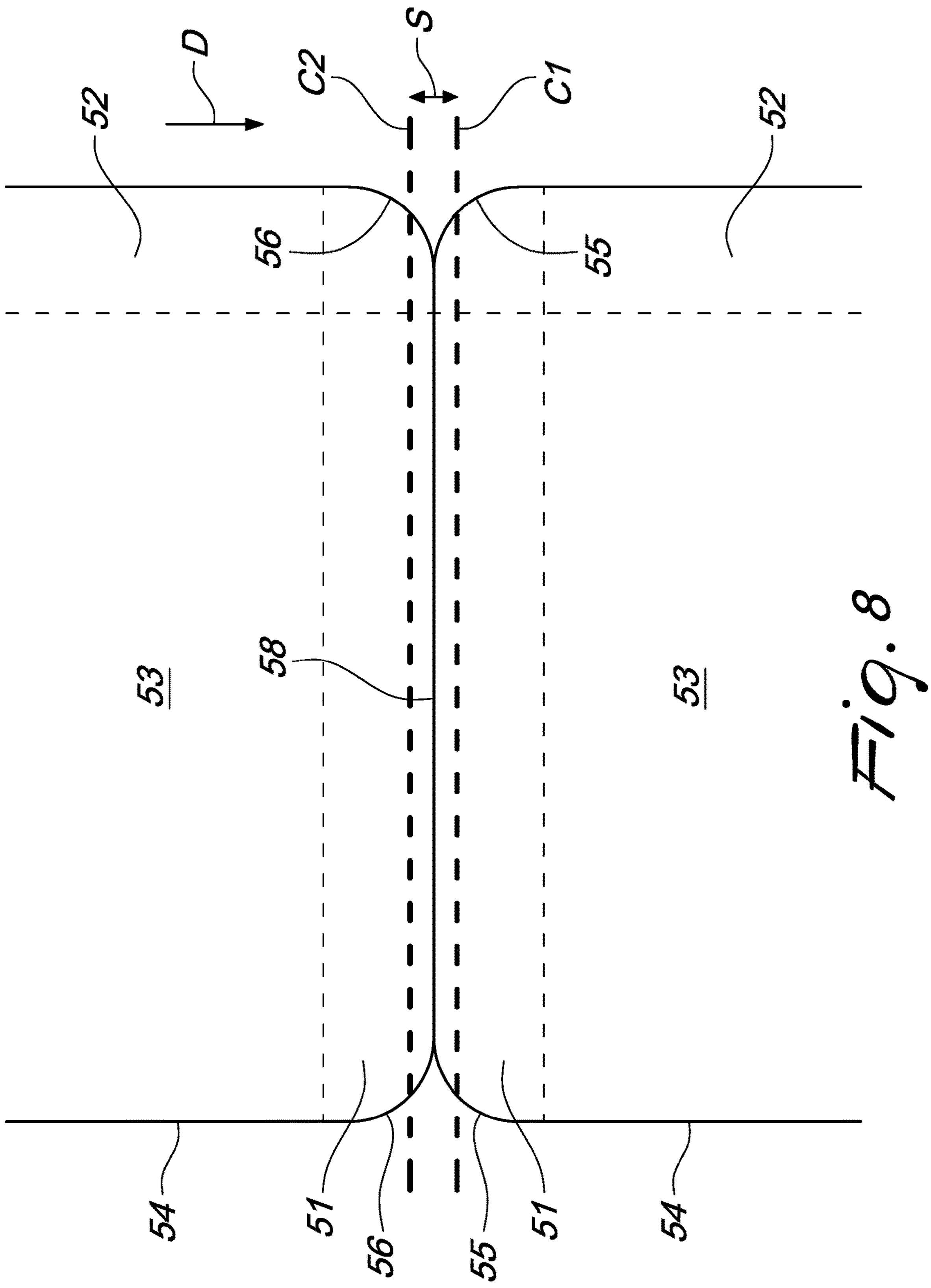
FIG. 8 is an enlarged-scale view of the transverse cutting lines, obtained with a double stroke of the cutting device of the preceding figures.

The apparatus 10 comprises, moreover, die cutting means 4C, of a per se known type, which are configured to die-cut from a part of the ribbon 5, along the longitudinal edges of the ribbon 5 and/or at the intersections between the longitudinal joining strips 52 and the transverse one 51, portions adapted to form preferably cusp-shaped recesses 55-56. For example, the die cutting means can comprise one or more cutting dies the cutting edge of which is quadrangular or diamond-shaped, with preferably concave sides (for example, substantially hypocycloidal or asteroid-like) with the diagonals oriented like the joining strips 51 and 52. FIG. 7 shows an asteroid-shaped opening 57 which is obtained with the die cutting of the ribbon 5 at an intersection between the joining strips 51 and 52 and which forms the cusp-shaped recesses toward the regions affected by the cutting operation.

According to one aspect of the invention, downstream of the devices described above the apparatus 10 comprises a transverse cutting device 1 having a feeding inlet 11 adapted to receive from the feeding means 2, along the substantially rectilinear feeding direction D, the ribbon 5, optionally cut longitudinally into a plurality of parallel ribbons by the longitudinal cutting device 3.

The feeding inlet 11 can be essentially a slit adapted to contain the ribbon 5 against movements at right angles to the plane of arrangement P and is preferably configured to form, frontally toward the blade 12, an abutment surface for the blade 12, so that the edges of the slit that are directed toward the blade act as a counter-blade in order to perform the transverse cut.

The transverse cutting direction C1 or C2 of the device 1 is substantially rectilinear and at right angles to the feeding direction D. The rectilinear cutting directions C1 and C2 define, together with the rectilinear feeding direction D, a geometric plane of arrangement P of the ribbon, i.e., a substantially ideal plane on which the ribbon 5 lies during its advancement through the feeding inlet 11.

The device 1 comprises at least one cutting blade 12 adapted to cut the ribbon 5 transversely to the feeding direction D, preferably at right angles to the direction D.

The cutting blade 12 can be a single blade with a double cutting edge or, as in the case shown, can be a set of two cutters with a single cutting edge which are arranged side by side, so that the blade 12 has a first cutting edge and a second cutting edge along respective opposite edges. Optionally, multiple transverse cutting blades 12, arranged side by side parallel to the feeding direction D of the ribbon 5, can be provided.

One or more suction ports 16 connected to a pump, in order to extract the cutting chips, can be provided along the blade 12.

The blade 12 is fixed on a blade holder 13, which in turn is mounted in a movable manner on a support 14.

The blade holder 13 can comprise a transverse member **13*c* along which the blade 12 is fixed. The transverse member 13*c* is connected to first movement means adapted to translate the transverse member substantially transversely to the plane of arrangement P of the ribbon 5 and to the feeding direction D and with a reciprocating motion between a first position and a second position with respect to the plane of arrangement P of the ribbon 5, so that the blade 12** passes through said plane P in the transition between said two positions.

The geometric plane traced by the first or second cutting edge with said translation movement of the transverse member **13*c* with respect to the support 14** is termed herein "cutting plane".

The first position of the blade holder 13, and particularly of the transverse member **13*c*, is such that the first cutting edge 12*a* of the cutting blade 12 faces the plane of arrangement P of the ribbon 5 and is preferably spaced from said plane. The second position of the blade holder 13 and particularly of the transverse member 13*c* is such that the second cutting edge 12*b* of the blade 12** faces the plane of arrangement P and is preferably spaced from said plane.

In order to allow said movement, the transverse member **13*c* can be supported by two uprights 13*a*-13*b*, which are associated with the support 14 so as to be able to extend or retract on command with respect to the support 14, along a plane that is substantially parallel to the cutting plane, i.e., transversely to the plane of arrangement P of the ribbon 5 and to the feeding direction D. In this manner, the transverse member 13*c* and consequently the blade 12 can be moved between the first position and the second position with respect to the plane of arrangement P of the ribbon 5**, passing through said plane during the transition between the two positions.

The cutting device 1 also comprises the first movement means, for example in the form of an electric actuator, which are adapted to translate the blade holder 13 substantially at right angles to the plane of arrangement P of the ribbon 5 and to the feeding direction D, and between said first and second positions.

For example, it is possible to use as an actuator such as a linear motor 17, the movable stem **17*a* of which is fixed to a beam 14*c* (described hereinafter) and the stator of which is fixed to a lower transverse member 13*d*, which is parallel and connected to the transverse member 13*c* by means of said uprights 13*a*-13*b*, which slide through the beam 14*c***.

Since the linear motor 17 operates vertically, one or more springs 18, for example of the magnetic type, can optionally be fixed between the beam **14*c* and the lower transverse member 13*d*, in order to counteract the force of gravity, i.e. counterbalance the weight, and allow the linear motor 17** to apply only dynamic forces.

Optionally, the blade holder 13 can comprise one or more side-by-side pushers 31, for example electric or pneumatic actuators, which are adapted to push the pouches 6 downward.

The support 14 of the blade holder 13 is movable substantially parallel to the advancement direction D of the ribbon 5. The support 14, in particular, translates with a reciprocating motion between a forward position and a retracted position along the feeding direction D and with respect to the ribbon 5 arriving at the feeding inlet 11. The stroke S of the support 14 along the direction D can be, for example, smaller than 5 mm.

The support 14 can be provided so that said beam **14*c* extends substantially at right angles to the feeding direction D and substantially parallel to the plane of arrangement P of the ribbon 5 and the beam 14*c* is provided with a pair of sliders 14*a*, 14*b* arranged, for example, at the ends of the beam 14*c*** and able to slide on respective guiding rails (not shown) parallel to the feeding direction D.

The feeding inlet 11 can be rigidly coupled to the beam **14*c***.

Second movement means 15 are provided in order to operate the sliding of the support 14 in the direction D with a forward/backward movement, particularly along said rails. The second movement means can be an electric actuator, for example a linear motor.

The first and second movement means are synchronized, for example by means of a controller, so as to make the blade 12 follow cyclically a substantially closed path. The closed path of the blade can be obtained by virtue of the forward/backward movement of the support 14 which is alternated with the up/down movement of the blade holder 13, so that each complete movement between the first position and the second position of the blade holder 13 is alternated with a respective complete movement between the forward position and the retracted position of the support 14.

In particular, the controller of the movement means of the blade holder 13 and of its support 14 can be configured so that:

- before the blade holder 13 passes from the first position to the second position, the support 14 is moved from the forward position to the retracted position;
- before the blade holder 13 passes from the second position to the first position, the support 14 is moved from the retracted position to the forward position.

The operation of the invention is evident from the description of the apparatus 10.

In particular, after the initial coupling between the sheets that compose it, the ribbon 5 is made to advance in step mode along the feeding direction D and, at the die cutting station 4C, the die cutting operation forms the cusp-shaped recesses 55, 56 with a constant pitch both along the external longitudinal edges 50 of the ribbon 5 and along any internal edges between the parallel ribbons that form as a consequence of the optional longitudinal cut.

At the cutting device 1, the transverse cut is performed from one longitudinal edge 50 to the other of the ribbon 5 and substantially at each one of the recesses 55-56.

This transverse cut is performed by means of at least two strokes of the blade 12, between which a relative translation S is performed between the cutting plane (followed by the blade holder 13) and the ribbon 5 substantially along the feeding direction D. In this manner, any cutting defects of the first stroke in the region of the recess 55-56 are leveled with the second stroke.

In the apparatus 10 according to the preferred embodiment of the invention, the relative translation is obtained by translating only the support 14 of the blade holder 13 between the forward position and the retracted position and vice versa, while the ribbon 5 remains stationary.

In another embodiment, not shown, said relative translation can be obtained with the advancement means 2, keeping the support 14 of the blade holder stationary.

With the first cutting stroke, the ribbon 5 is cut transversely along the direction C1 with the first cutting edge 12*a*. Cutting is performed with the support 14 in a retracted position, so that it occurs essentially downstream with respect to the line 58 of the cusps, i.e., of the ideal centerline between the pockets 53 of the ribbon 5. With the first cutting stroke, the pouch 6 or the pouches arranged side by side in a transverse direction of the ribbon 5 are made to fall by gravity and have a rounded edge 55 at the corners, since the cut has been performed, if not exactly at the centerline 58, downstream of said line with respect to the direction D.

Figure 4:
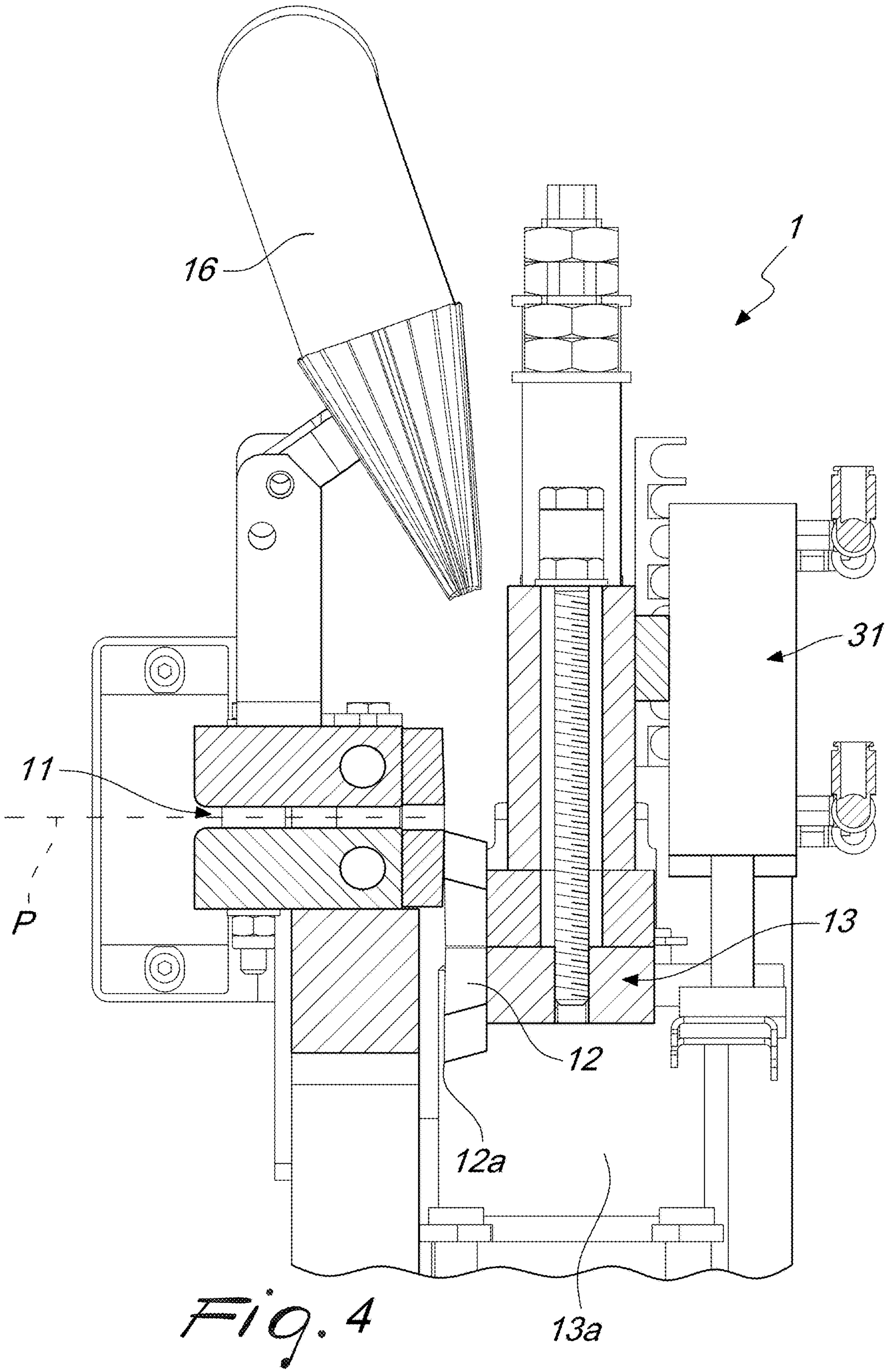
FIG. 4 is a sectional view, taken along the plane IV-IV of FIG. 3.

The blade 12 reaches the second cutting position, shown in FIG. 4, which in the case shown is a lowered position.

The support 14 is then moved by the amount S in the forward position, translating therefore toward the ribbon 5, and the second stroke of the blade is performed by means of the second cutting edge 12*b* and along the line C2. In this manner, the blade 12 levels any excess burr that results from the first cutting stroke and returns to the first position, shown in FIG.

The support 14 is finally made to retract into the retracted position, while the ribbon 5 is made to advance by an advancement step (substantially equal to the distance between two parallel lines of the cusps 58) so as to perform in the same manner the transverse cutting of the subsequent pouch 6 or set of pouches 6.

Figure 5:
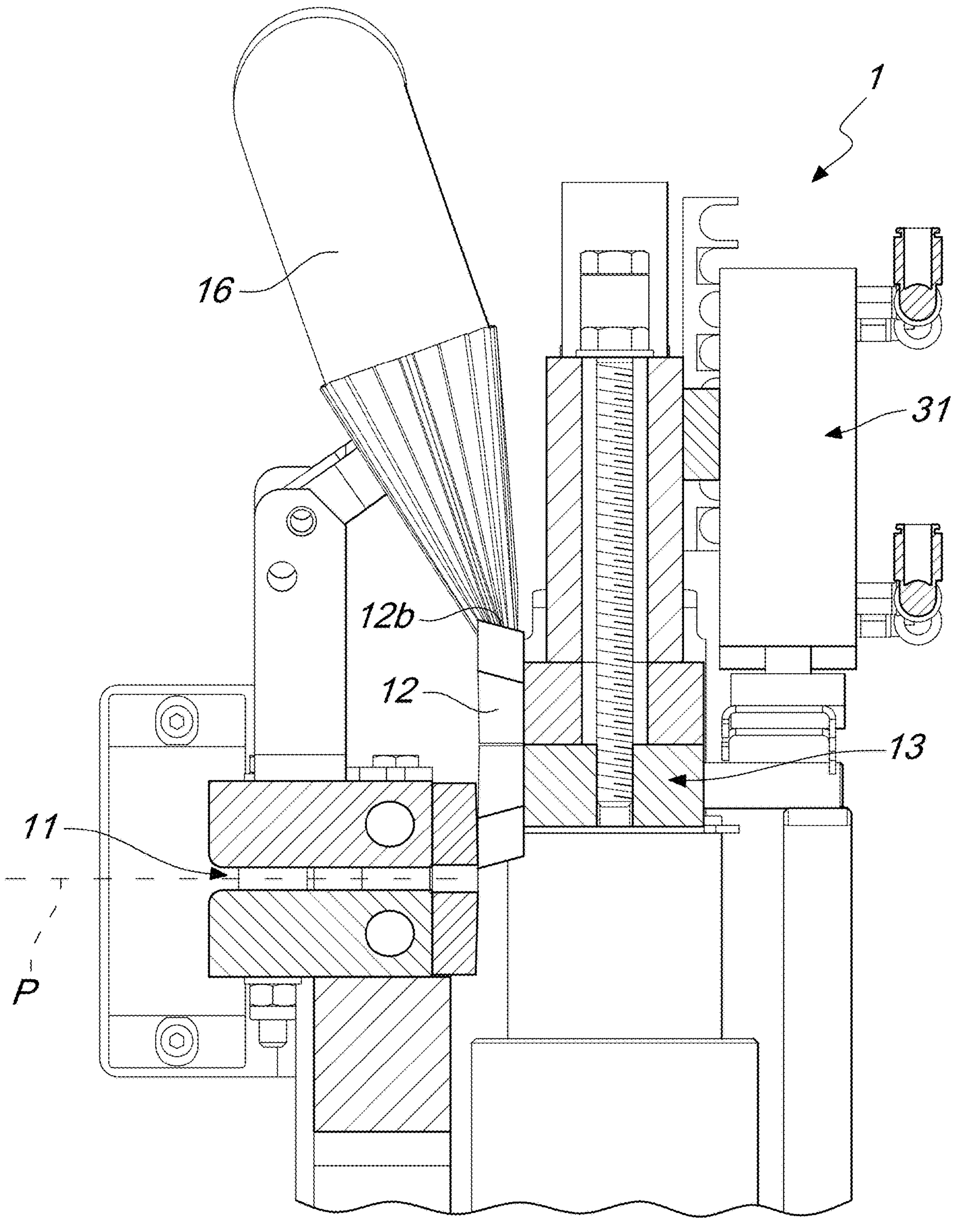
FIG. 5 is a sectional view, taken along the plane V-V of FIG. 2*a;*
Figure 6:
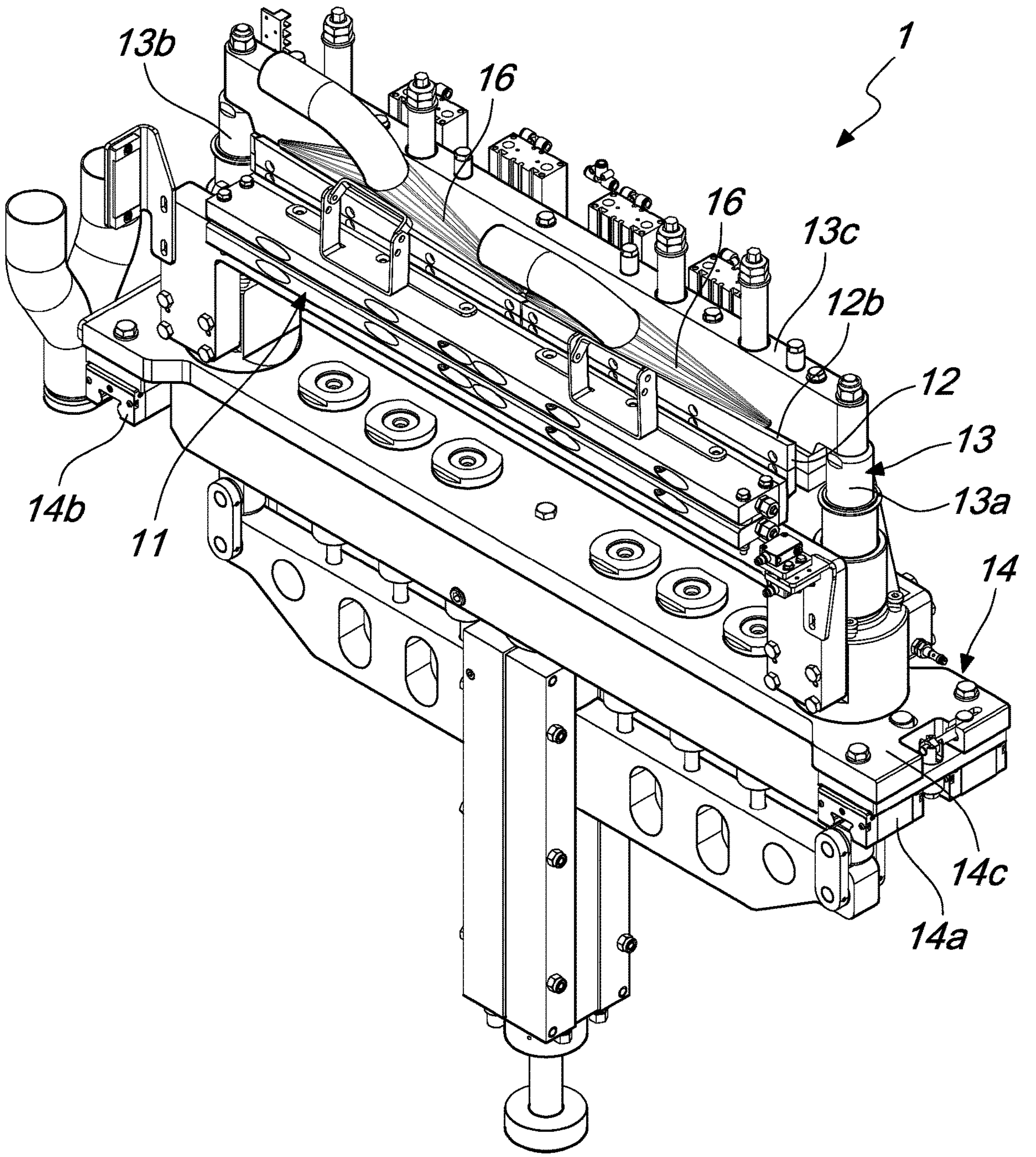
FIG. 6 is a perspective view of the cutting device of FIG. 2*a;*

Substantially, the cutting method performs cyclically the following operations:

a) before performing the first cutting stroke and with the ribbon 5 stationary, advancement or retraction of the cutting plane by a distance S (much smaller than the advancement step of the ribbon 5) with respect to the ribbon 5 and along the feeding direction D, b) movement of the blade 12 toward the ribbon 5 from the first position (FIG. 5) to the second position (FIG. 4) so that the first cutting edge 12*a* performs the first cutting stroke (line C1);

c) after performing the first cutting stroke and before performing the second cutting stroke, retraction or advancement, respectively, of the cutting plane with respect to the ribbon 5 along the feeding direction D and by the same distance S;

d) movement of the blade toward the ribbon 5 from the second position (FIG. 4) to the first position (FIG. 5) so that the second cutting edge 12*b* performs the second cutting stroke (line C2);

e) advancement of the ribbon 5 by an advancement step.

In practice it has been found that the invention achieves the intended aim and objects, providing a method in which, if a first cutting stroke used normally in the field does not arrive exactly at the centerline 58 that joins the die-cut cusps on a ribbon, a second cutting stroke eliminates any cut-off burr that might protrude from the centerline 58 after the first cutting stroke.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102020000027989 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A cutting method, for manufacturing pouches of flexible containers with rounded corners, comprising the steps of:

stepwise advancing a ribbon, comprising pockets formed between layers thereof, along a substantially rectilinear feeding direction, said ribbon comprising a plurality of recesses along at least one longitudinal edge thereof that is substantially parallel to said substantially rectilinear feeding direction;

transverse cutting from one longitudinal edge to another of said ribbon and substantially at each one of said recesses, said transverse cutting being performed by means of at least one blade, said at least one blade being movable with respect to said ribbon substantially along a cutting plane that is transverse to said ribbon and to said feeding direction;

wherein substantially at each one of said recesses, said transverse cutting of the ribbon is performed by means of at least two strokes of said at least one blade, and wherein between a first stroke and a second stroke of said at least two strokes of said at least one blade a relative translation is performed between said cutting plane and said ribbon substantially along said feeding direction, wherein said second stroke removes any cutting defects of the first stroke in a region of said recess.

2. The method according to claim 1, wherein said relative translation between said ribbon and said cutting plane is less than 5 mm.

3. The method according to claim 1, comprising a step of providing a first cutting edge and a second cutting edge along respective opposite edges of said at least one blade, said method further comprising a step of moving said at least one blade along said cutting plane with a reciprocating motion;

wherein said first stroke is performed with said first cutting edge and said second stroke is performed with said second cutting edge.

4. The method according to claim 3, wherein the step of moving said at least one blade consists in moving with said reciprocating motion a blade holder on which said at least one blade is fixed and which is arranged downstream of said plurality of recesses with respect to said feeding direction.

5. The method according to claim 4, wherein the step of relative translation between said cutting plane and said ribbon comprises a step of providing a support on which said blade holder is mounted and which is translated with respect to said ribbon substantially along said feeding direction and between said first stroke and said second stroke.

6. The method according to claim 1, further comprising the steps of:

a) advancing or retracting the cutting plane with respect to said ribbon along said feeding direction before the first stroke, b) moving said at least one blade toward said ribbon from a first position to a second position so that the first cutting edge performs the first stroke;

c) after the first stroke and before the second stroke, retracting or advancing, respectively, the cutting plane with respect to said ribbon along said feeding direction;

d) moving said at least one blade toward said ribbon from said second position to said first position so that the second cutting edge performs the second stroke;

e) advancing the ribbon by at least said advancement step;

f) repeating steps a)-e).

7. The method according to claim 1, wherein said ribbon comprises a plurality of pockets arranged mutually side by side along at least said feeding direction, said pockets being formed between at least two layers of said ribbon and being alternated, along a longitudinal direction, with transverse joining strips between said at least two layers, to a side of each one of said transverse joining strips there being at least one of said recesses, said recesses being cusp-shaped.

8. A cutting device for cutting ribbons for apparatuses for manufacturing pouches of flexible containers with rounded corners, the cutting device comprising:

a feeding inlet adapted to receive, along a substantially rectilinear feeding direction, a ribbon to be cut along at least one substantially rectilinear cutting direction, said at least one cutting direction being transverse with respect to said feeding direction and forming, together with said feeding direction, a geometric plane of arrangement of the ribbon;

at least one cutting blade adapted to cut said ribbon along said at least one cutting direction;

a blade holder on which said at least one cutting blade is mounted, said blade holder being mounted on a support and being movable, with respect to said support and transversely with respect to said plane of arrangement, between a first position and a second position in order to perform said cut by means of said at least one blade;

first movement means adapted to move said blade holder between said first and second positions;

wherein said support is configured to move with a reciprocating motion substantially parallel to said plane of arrangement between a forward position and a retracted position along said feeding direction in order to allow a respective cutting stroke of said at least one blade in each one of said forward and retracted positions;

wherein said at least one cutting blade comprises a first cutting edge and a second cutting edge along respective opposite edges of said at least one blade, said first position of the blade holder is such that the first cutting edge is directed toward said plane of arrangement, said second position of the blade holder is such that the second cutting edge is directed toward said plane of arrangement;

wherein the cutting device comprises at least one port which can be connected to a pump and is arranged along said first cutting edge, said second cutting edge, or both.

9. The cutting device according to claim 8, comprising:

second movement means adapted to move said support with said reciprocating motion between said forward and retracted positions, said first and second movement means being synchronized so as to make said at least one blade follow cyclically a substantially closed path.

10. The cutting device according to claim 9, wherein in order to obtain said substantially closed path of said at least one blade the first and second movement means are synchronized so that:

before the blade holder passes from the first position to the second position, the support is moved from the forward position to the retracted position;

before the blade holder passes from the second position to the first position, the support is moved from the retracted position to the forward position.

11. An apparatus for manufacturing pouches of flexible containers with rounded corners, the apparatus including the cutting device of claim 8 and further comprising:

means for unwinding a single sheet or a plurality of sheets in reel form;

coupling means for mutually fixing said plurality of sheets, or for mutually fixing two halves of said single sheet in reel form which is folded longitudinally onto itself, along transverse joining strips which are substantially mutually parallel along at least one transverse direction so as to obtain said ribbon;

means for the stepwise advancement of said ribbon along said feeding direction which is substantially parallel to or coincides with a longitudinal direction of the ribbon, the advancement being equal to, or a multiple of, a distance between two transverse joining strips arranged side by side in said longitudinal direction, wherein the feeding inlet of the cutting device is arranged in said apparatus so as to receive said ribbon from said advancement means.

12. The apparatus according to claim 11, wherein said coupling means are further adapted to mutually fix said plurality of sheets along one or more longitudinal joining strips which are substantially parallel to said longitudinal direction of the ribbon; said apparatus further comprising, upstream of said cutting device and downstream of said coupling means with respect to the feeding direction:

longitudinal cutting means adapted to cut said ribbon along said longitudinal joining strips and to consequently form a plurality of substantially parallel ribbons;

die cutting means for cutting out from said ribbon, along the edges of said ribbon and/or at the intersections between said longitudinal and transverse joining strips, portions adapted to form cusp-shaped recesses along the longitudinal edges of said substantially parallel ribbons.

13. A device for cutting ribbons for apparatuses for manufacturing pouches of flexible containers with rounded corners, the device comprising:

a feeding inlet adapted to receive, along a substantially rectilinear feeding direction, a ribbon to be cut along at least one substantially rectilinear cutting direction, said at least one cutting direction being perpendicular with respect to said feeding direction and forming, together with said feeding direction, a geometric plane of arrangement of the ribbon;

at least one cutting blade adapted to cut said ribbon along said at least one cutting direction by moving perpendicularly to said geometric plane of arrangement of the ribbon;

a blade holder on which said at least one cutting blade is mounted, said blade holder being mounted on a support and being movable, with respect to said support and transversely with respect to said plane of arrangement, between a first position and a second position in order to perform said cut by means of said at least one blade; and first movement means adapted to move said blade holder between said first and second positions, wherein said support is configured to move with a reciprocating motion substantially parallel to said plane of arrangement between a forward position and a retracted position along said feeding direction in order to allow a respective cutting stroke of said at least one blade in each one of said forward and retracted positions, wherein said at least one cutting blade comprises a first cutting edge and a second cutting edge along respective opposite edges of said at least one blade, said first position of the blade holder is such that the first cutting edge is directed toward said plane of arrangement, said second position of the blade holder is such that the second cutting edge is directed toward said plane of arrangement.

* * * * *